United States Patent
Mori et al.

(10) Patent No.: US 8,311,333 B2
(45) Date of Patent: Nov. 13, 2012

(54) AREA DETERMINATION METHOD, IMAGE COMPRESSION METHOD, IMAGE COMPRESSION APPARATUS, AND RECORDING MEDIUM

(75) Inventors: Toshihiro Mori, Neyagawa (JP); Osamu Tamura, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 951 days.

(21) Appl. No.: 12/361,641

(22) Filed: Jan. 29, 2009

(65) Prior Publication Data

US 2009/0304295 A1 Dec. 10, 2009

(30) Foreign Application Priority Data

Jun. 4, 2008 (JP) ................................ 2008-146822

(51) Int. Cl.
  G06K 9/36 (2006.01)
  G06K 9/42 (2006.01)
(52) U.S. Cl. .......................... 382/181; 382/237; 382/258
(58) Field of Classification Search .................. 382/302, 382/239, 171, 172, 170, 224, 181, 112, 113, 382/148, 162, 166, 164, 168, 169, 173, 176, 382/232, 237, 254, 258, 266; 358/453, 462, 358/464, 471, 518, 403, 527, 448, 500, 443
See application file for complete search history.

(56) References Cited

U.S. PATENT DOCUMENTS

| 7,869,651 B2* | 1/2011 | Makino | 382/167 |
| 8,009,908 B2* | 8/2011 | Yago | 382/170 |
| 8,023,743 B2* | 9/2011 | Makino et al. | 382/199 |

FOREIGN PATENT DOCUMENTS

| JP | 9-65143 | 3/1997 |
| JP | 10-285394 A | 10/1998 |
| JP | 2005-079787 A | 3/2005 |

OTHER PUBLICATIONS

A Notification of Reasons for Refusal issued in corresponding Japanese Patent Application No. 2008-146822, mailed Sep. 1, 2009, and English translation thereof.

* cited by examiner

*Primary Examiner* — Sheela Chawan

(74) *Attorney, Agent, or Firm* — Buchanan Ingersoll & Rooney PC

(57) ABSTRACT

First, a binary image is generated by binarizing an image. Next, a binary pixel ratio, that is a ratio of a binary pixel quantity that is a quantity of dotted pixels included in a specific area of the binary image to a total quantity of pixels included in the specific area of the binary image, is found. Then, a thin-line image is generated by performing a line-thinning process on the specific area. After that, a thin-line pixel ratio that is a ratio of the quantity of dotted pixels included in the generated thin-line image to the binary pixel quantity is found, and the specific area is determined to be a map area or a photograph area based on the calculated binary pixel ratio and the calculated thin-line pixel ratio.

16 Claims, 10 Drawing Sheets

AREA DETERMINATION METHOD, IMAGE COMPRESSION METHOD, IMAGE COMPRESSION APPARATUS, AND RECORDING MEDIUM

This application is based on Japanese patent application No. 2008-146822 filed on Jun. 4, 2008, the contents of which are hereby incorporated by reference.

BACKGROUND OF THE INVENTION

1. Field of the Invention

The present invention relates to a method for compressing image data scanned by a scanner and to an image processing apparatus and the like that performs such compression.

2. Description of the Related Art

Conventionally, image processing apparatuses called MFPs (Multi Functional Peripherals) have often been used to attach image data obtained by scanning a document to emails and send those emails. Color-compatible models of such image forming apparatuses have recently come into frequent use, and the demand to be able to attach color image data to emails and send the emails is increasing.

However, when, for example, an A4-sized document is scanned at 300 dpi in full color, the size of the resulting color image data is approximately 25 MB, and there are cases where it is difficult to attach such a large file to an email and send the email. It is therefore common to compress such image data before sending it. However, compressing the entirety of the image data at a high compression rate in order to enable it to be sent via email can result in characters present in the image blurring and thus becoming illegible. Meanwhile, reducing the compression rate in order to make the characters legible may not result in a file size that is small enough to be sent.

Accordingly, a conventional scheme that reduces the data amount by using a technique that generates a PDF (Portable Document Format) file with a high compression rate, called high-compression PDF or compact PDF, is used. A PDF file is generated in the following manner according to such a technique.

First, an area with objects such as characters, graphics, and photographs included in the image to be converted (the target image) is extracted. It is then determined whether the extracted area is an area including characters or an area including an object aside from characters. The area including characters is binarized, and a single representative color is determined for the characters. A compression process is then performed, taking into consideration the legibility of the characters. The areas including objects aside from characters are then compressed at a high compression rate. Through this, a PDF file is generated at a high compression rate, taking into consideration the legibility of the characters.

Incidentally, there are cases where maps are included in the target image. Maps normally include characters expressing place names or the like. However, when generating the above-mentioned high-compression PDF file, areas including maps are determined to be areas including objects that are not characters. In such a case, the compression process does not take into consideration the legibility of the characters included in the maps, and thus those characters will become difficult to read.

In order to maintain the legibility of characters included in maps, it is thus necessary to apply a compression process appropriate for map areas to those map areas. To do so, it is necessary to distinguish map areas from other areas.

The conventional methods have been proposed as techniques relating to determining map areas (Japanese Patent Laid-Open No. 2005-79787 [Patent Document 1] and Japanese Patent Laid-Open No. H10-285394 [Patent Document 2]).

According to the method of Patent Document 1, a histogram is generated, indicating the darkness distribution properties of a document image obtained by a document reading unit reading a map document. The respective ratios of high-darkness component, medium-darkness component, and low-darkness component to the overall darkness component present in the document image are then found using the generated histogram. In the case where the ratio of the medium-darkness component and the high-darkness component is greater than the ratio of the low-darkness component, the document image is determined to be a document image of a map manufactured abroad, whereas in the case where the ratio of the medium-darkness component and the high-darkness component is less than the ratio of the low-darkness component, the document image is determined to be a document image of a map manufactured in Japan.

Meanwhile, according to the method of Patent Document 2, pattern matching is performed on a document image using a ridge pixel pattern of a predetermined size (5 pixels high by 5 pixels wide), thereby detecting character pixels present in halftone dots included in the image. In the case where the quantity of character pixels is high, the document is determined to be a map-like document, whereas in the case where the quantity of character pixels is low, the document is determined to be a general type of document.

With the method of Patent Document 1 as described above, area determination is carried out based on whether or not the ratio of medium-darkness component and high-darkness component pixels is high. When attempting to distinguish map areas from other types of areas using such a determination method, areas with photographs or the like that have darkness distribution properties similar to maps are mistakenly determined to be map areas. It is therefore highly likely that map areas cannot be accurately distinguished from non-map areas using the method of Patent Document 1.

Meanwhile, with the method of Patent Document 2, a pixel of interest is determined, pattern matching is performed on the pixel of interest and its surrounding pixels using a ridge pixel pattern of a predetermined size, and it is then determined whether or not the pixel of interest is a character pixel. This process must be performed on all pixels, one at a time, and thus requires a significant amount of processing.

SUMMARY

Having been conceived in light of such problems, it is an object of the present invention to make it possible to accurately determine map areas using a simpler process than the conventional techniques.

According to one aspect of the present invention, a method for compressing an image includes generating a binary image by binarizing the image, calculating a binary pixel ratio that is a ratio of a binary pixel quantity that is a quantity of dotted pixels included in a specific area of the binary image to a total quantity of pixels included in the specific area of the binary image, generating a thin-line image by performing a line-thinning process on the specific area, calculating a thin-line pixel ratio that is a ratio of the quantity of dotted pixels included in the thin-line image to the binary pixel quantity, determining that the specific area is a map area or a photograph area based on the calculated binary pixel ratio and the calculated thin-line pixel ratio, compressing, when the specific area is determined to be a photograph area, an image of the specific area after reducing resolution of the image of the specific area, and compressing, when the specific area is determined to be a map area, the image of the specific area without reducing the resolution of the image of the specific area.

Preferably, the image of the specific area may be compressed at a lower compression ratio when the specific area is determined to be a map area than when the specific area is determined to be a photograph area.

DESCRIPTION OF THE PREFERRED EMBODIMENTS

Figure 1:
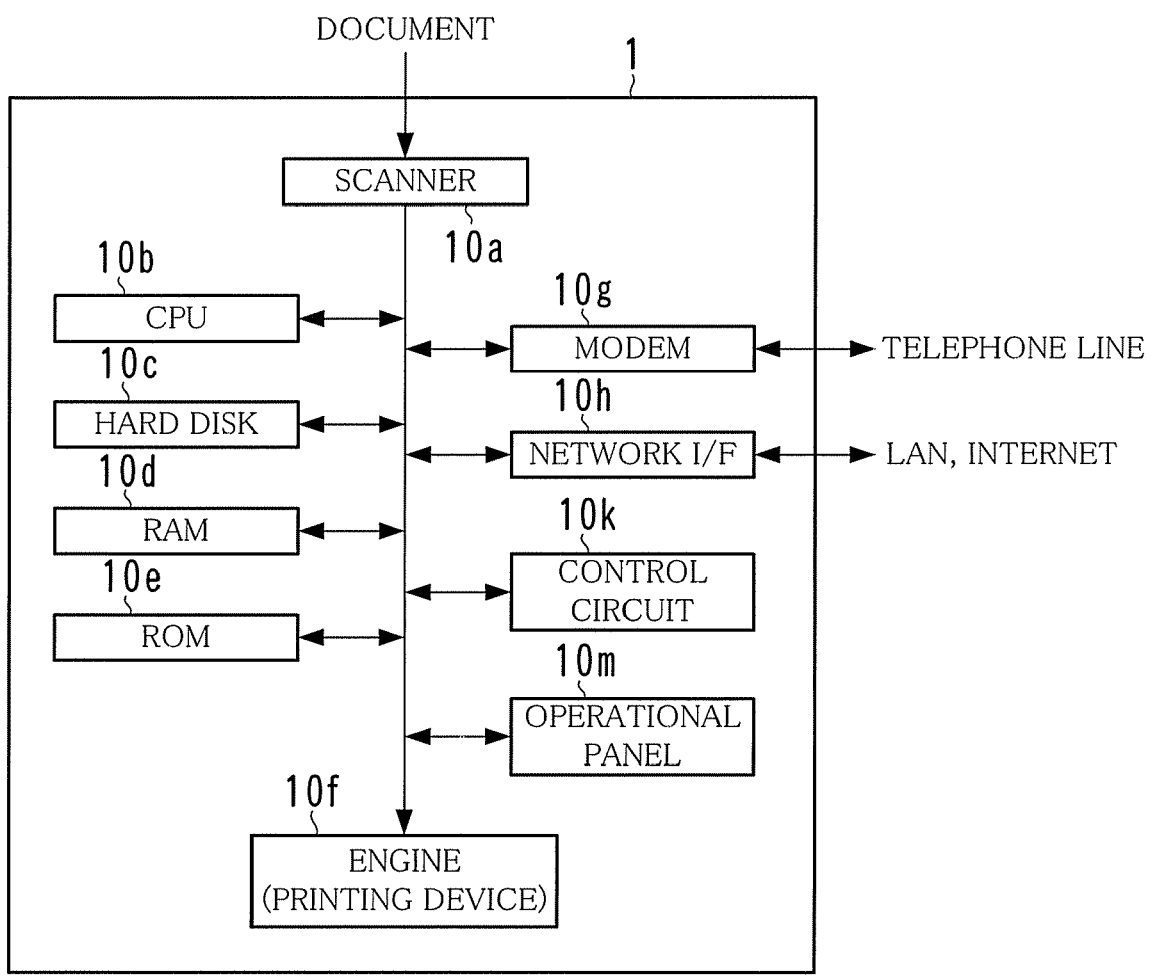
FIG. 1 is a diagram illustrating an example of the hardware configuration of an image forming apparatus according to an embodiment of the present invention.

FIG. 1 is a diagram illustrating an example of the hardware configuration of an image forming apparatus 1 according to an embodiment of the present invention.

The image forming apparatus 1 is an image processing apparatus that integrates a variety of functions, such as copying, scanning, faxing, network printing, document server functionality, file transfer functionality, and so on. Such devices are also sometimes called MFPs, or Multi-Function Peripherals.

As shown in FIG. 1, the image forming apparatus 1 is configured of a scanner 10a, a CPU 10b, a hard disk 10c, a RAM 10d, a ROM 10e, a printing device 10f, a modem 10g, a network interface 10h, a control circuit 10k, an operational panel 10m, and so on.

The scanner 10a is a device that optically scans images such as photographs, characters, drawings, charts, and so on that are printed on a paper document (called simply a "document" hereinafter) and creates digital data thereof. The scanned image is stored as image data in a format, such as the bitmap format, expressed as RGB (red (R), green (G), and blue (B)). By making settings in advance, it is also possible to store the data in the PDF (Portable Document Format) or the XPS (XML Paper Specification) format.

The CPU 10b performs processing for converting the image data of the document scanned by the scanner 10a into a file in a format such as TIFF, JPEG, bitmap, PDF, or the like.

The CPU 10b also performs overall control of the image forming apparatus 1, such as detecting input from a user, controlling displays made in the operational panel 10m, the creation of emails, and so on.

The printing device 10f is a device for printing, onto paper, an image representing the image data scanned by the scanner 10a or an image representing image data sent from another device. In the case where the image forming apparatus 1 is capable of color printing, the printing is performed using four colors of toner, or yellow, magenta, cyan, and black.

The operational panel 10m is a device through which the user makes various inputs with respect to the image forming apparatus 1. The operational panel 10m is configured of an operational unit, a display unit, and the like. Using the operational panel 10m, the user can make various inputs, such as selecting the format in which to store image data, setting scanning conditions, inputting commands to start or execute processes, inputting email addresses, and so on.

The modem 10g is provided with a NCU (Network Control Unit), and connects to another fax terminal via an analog public line, performing data control based on a facsimile protocol, modulation/demodulation of fax data, and so on.

The network interface 10h is a NIC (Network Interface Card), and is an interface for connecting to another device via a LAN, the Internet, or the like.

The control circuit 10k is a circuit for controlling devices such as the hard disk 10c, the operational panel 10m, the scanner 10a, the printing device 10f, the modem 10g, the network interface 10h, and so on. The control circuit 10k is configured, for example, of a hardware circuit that uses various types of electrical components.

Figure 2:
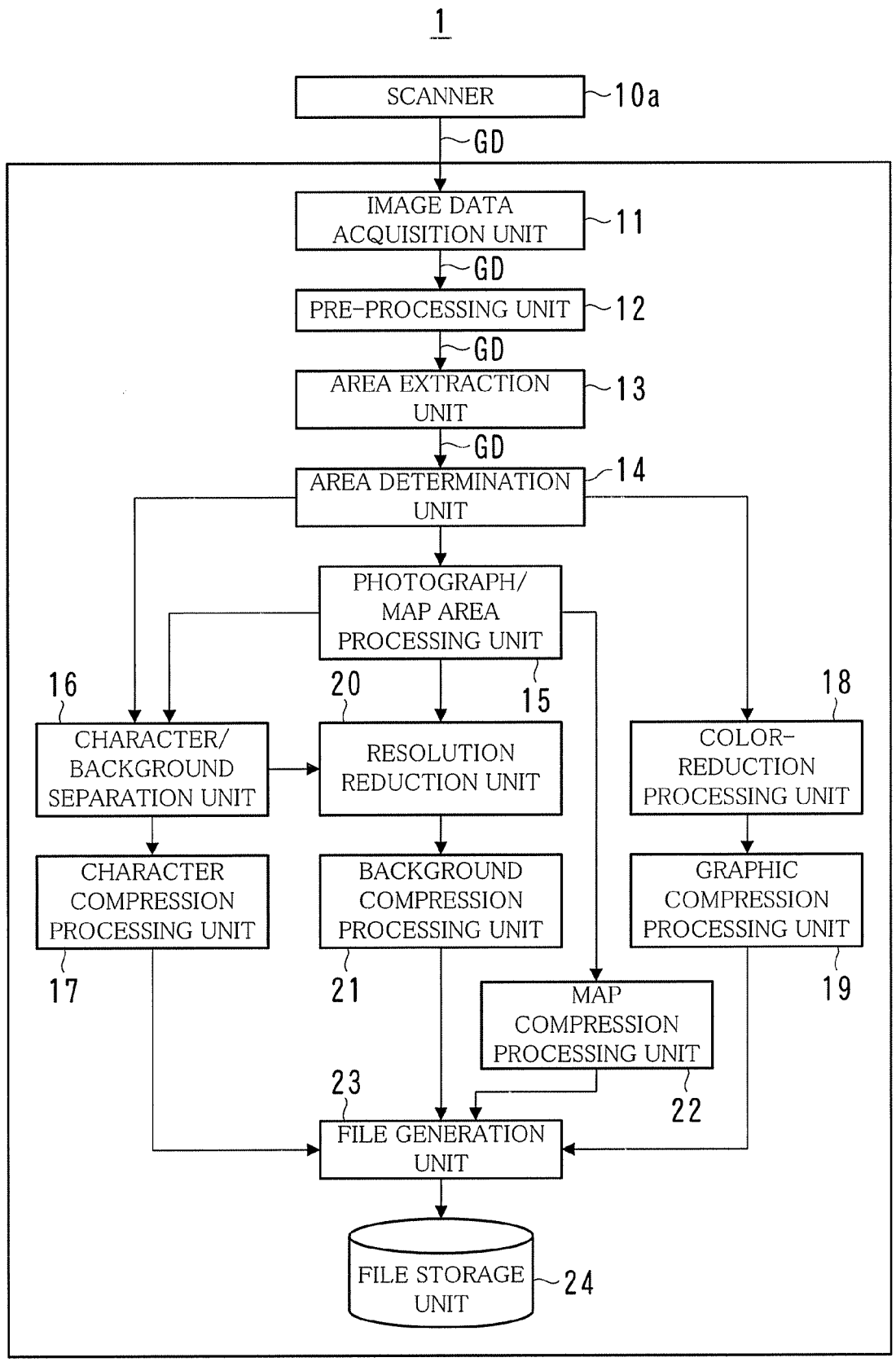
FIG. 2 is a diagram illustrating an example of the functional configuration of an image forming device.

Programs (computer programs), data, and so on for implementing the functions of the various units described later using FIG. 2 are stored in the hard disk 10c. These are read out as necessary from the RAM 10d, and the programs are executed by the CPU 10b. Part or all of these programs or data may be stored in the ROM 10e. Alternatively, some or all of the functions shown in FIG. 2 may be implemented by the control circuit 10k.

Figure 3A:
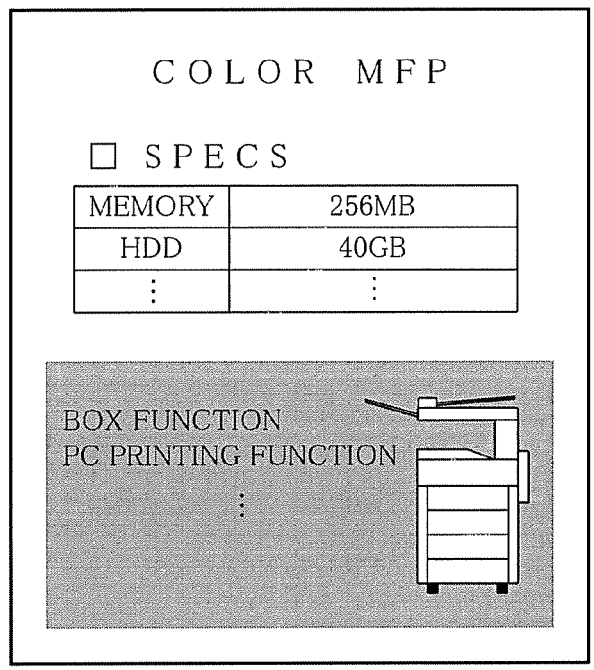
FIGS. 3A and 3B are diagrams illustrating an example of a printed document image.
Figure 3B:
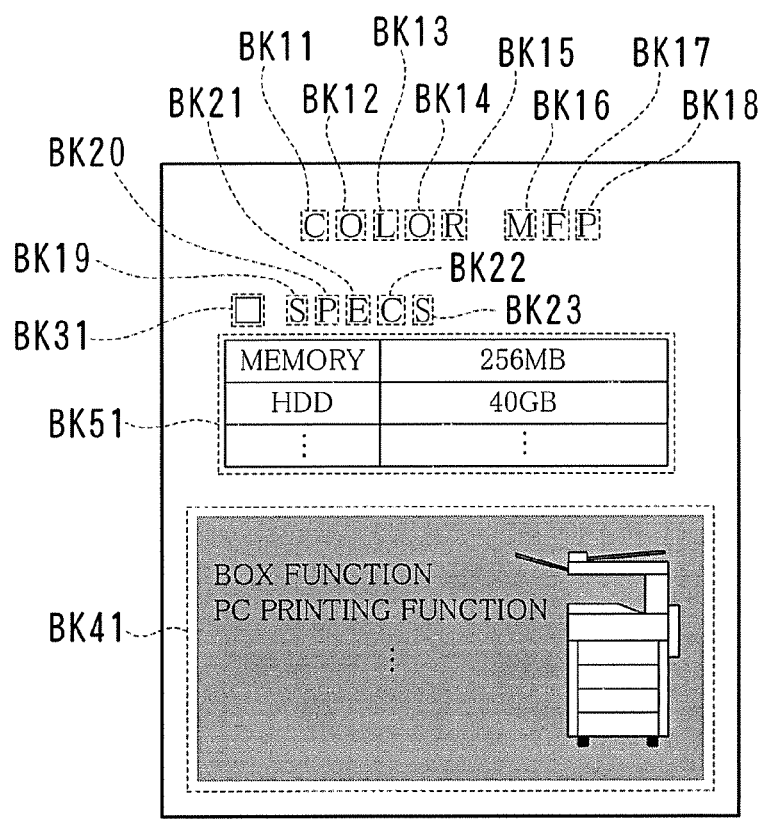

FIG. 2 is a diagram illustrating an example of the functional configuration of the image forming apparatus 1, and FIGS. 3A and 3B are diagrams illustrating an example of a printed document image. Next, processes performed by the elements of the image forming apparatus 1 on document image data GD, obtained by scanning a document using the scanner 10a, when converting the document into a file in the PDF format (a PDF file) and storing that file, shall be described with reference to FIGS. 2, 3A, and 3B.

As illustrated in FIG. 2, the image forming apparatus 1 is configured of an image data acquisition unit 11, a pre-processing unit 12, an area extraction unit 13, an area determination unit 14, a photograph/map area processing unit 15, a character/background separation unit 16, a character compression processing unit 17, a color reduction processing unit 18, a graphic compression processing unit 19, a resolution reduction unit 20, a background compression processing unit 21, a map compression processing unit 22, a file generation unit 23, a file storage unit 24, and so on.

When the user sets a document in the scanner 10a, sets the storage format to PDF, and inputs a command to execute the scan, the scanner 10a scans the image of the document, and generates document image data GD, expressed as RGB data, in a pre-specified format such as TIFF, JPEG, bitmap, or the like.

The image data acquisition unit 11 then acquires the document image data GD. The pre-processing unit 12 performs processes such as image format conversion, resolution conversion, base elimination, and so on.

The area extraction unit 13 performs a labeling process by extracting areas, included in the image represented by the document image data GD (document image), in which objects such as characters, graphics, and photographs are present. This process is carried out, for example, as follows.

First, the document image data GD is binarized. Black pixel groups, which are series of black pixels that form characters, graphics, photographs, and so on, are then detected in the image obtained as a result of the binarization (a binary image). Black pixel groups that are comparatively close to each other are detected as a single black pixel group. A quadrangular area that encapsulates the detected black pixel group is then found. In other words, for example, the position of the quadrangular area in the binary image (that is, the position in the document image) is found. Such quadrangular areas shall be called "blocks BK" hereinafter.

For example, in the case where the document image is as shown in FIG. 3A, blocks BK11, BK12, and so on containing characters, a block BK31 containing a graphic, and a block BK41 containing a photograph, as illustrated in FIG. 3B, are found through the processing performed by the area extraction unit 13.

The area determination unit 14 determines the type of the block BK based on the size of the block BK, the quantity of pixels in edge portions of the object included within the block BK, and so on. In other words, the area determination unit 14 determines whether each block BK is a character block BK, a graphic block BK, or another type of block BK. Note that in the present embodiment, blocks BK including charts are also determined to be character blocks BK.

The photograph/map area processing unit 15 performs a photograph/map determination process on blocks BK whose types have been determined by the area determination unit 14 to be neither characters nor graphics (called "non-character/graphic blocks BKh" hereinafter), thereby determining whether the block BK contains a photograph or a map. Furthermore, characters included in the block BK that has been determined to be a photographic block BK are extracted, and blocks BK that contain those characters are found. Details regarding the processing procedure of the photograph/map area processing unit 15 shall be given later.

The character/background separation unit 16 performs a process for separating the character portions from the background portions included in the blocks BK determined by the area determination unit 14 to be character blocks BK and the character blocks BK found by the photograph/map area processing unit 15. This process is carried out as follows.

The portion of the document image corresponding to that block BK is first binarized. In the case where that portion includes characters with a darkness higher than a binarization threshold rendered on top of a base (background) with a darkness lower than that threshold, or in other words, the case where dark characters are rendered on top of a light background, the pixels that form the characters are black pixels, or dotted pixels, and the pixels of the background are white pixels, or non-dotted pixels. In other words, the pixels that form characters and the background pixels are separated into black pixels and white pixels. Hereinafter, the images in the portions of the document image corresponding to the blocks BK shall be referred to as "partial document images".

The character compression processing unit 17 compresses the data of pixels that form characters using a lossless compression technique such as MMR. The compression performed at this time does not involve a resolution reduction process.

The color reduction processing unit 18 performs a color reduction process on the data of the partial document image in the blocks BK determined to be graphic blocks BK, thereby uniformizing the colors. The graphic compression processing unit 19 compresses the color-reduced data using a lossless compression technique such FLATE.

The resolution reduction unit 20 performs a resolution reduction process on the data of the partial document image of the blocks BK determined to be photographic blocks BK. The resolution reduction unit 20 also performs a resolution reduction process on background portions identified by the character/background separation unit 16. This process reduces the resolution from, for example, 300 dpi to 150 dpi.

The background compression processing unit 21 compresses the reduced-resolution photograph and character background data using a compression technique such as JPEG.

The map compression processing unit 22 compresses the partial document image data in blocks BK determined to be map blocks BK using a compression technique such as JPEG. The compression performed at this time is carried out at least a lower compression rate than that employed by the background compression processing unit 21 so that the image quality of the maps remains better than that of the photographs and background.

The file generation unit 23 generates a PDF file using the compressed pieces of data generated by the character compression processing unit 17, the graphic compression processing unit 18, the background compression processing unit 21, and the map compression processing unit 22, respectively. The file storage unit 24 then stores the generated PDF file.

Figure 4:
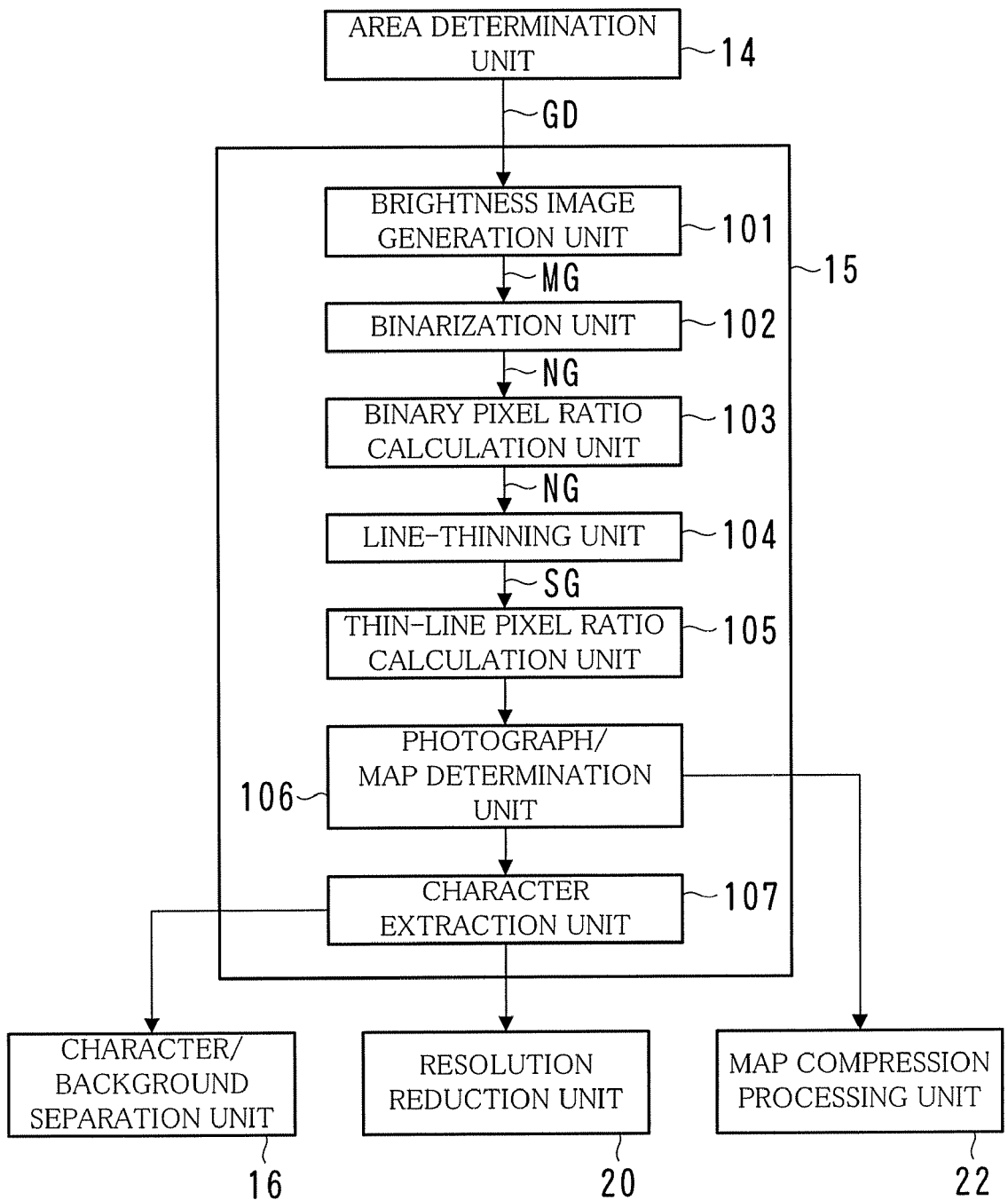
FIG. 4 is a diagram illustrating an example of a photograph/map area processing unit.
Figure 5A:
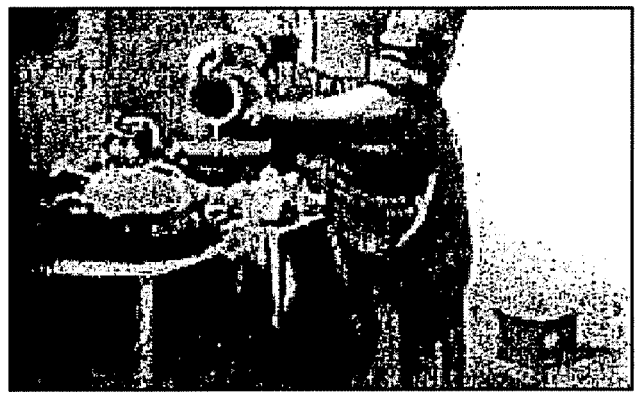
FIGS. 5A to 5C are diagrams illustrating an example of a photographic image.
Figure 5B:
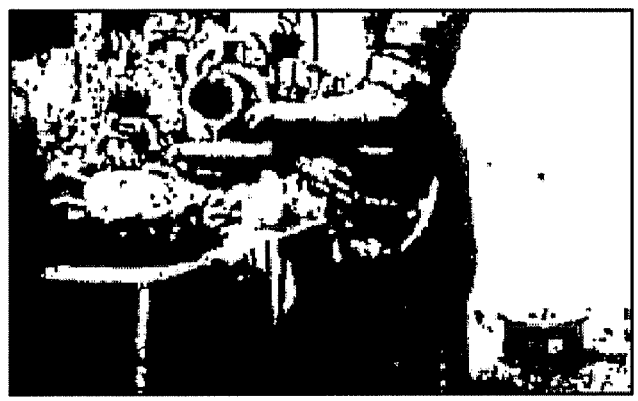
Figure 5C:
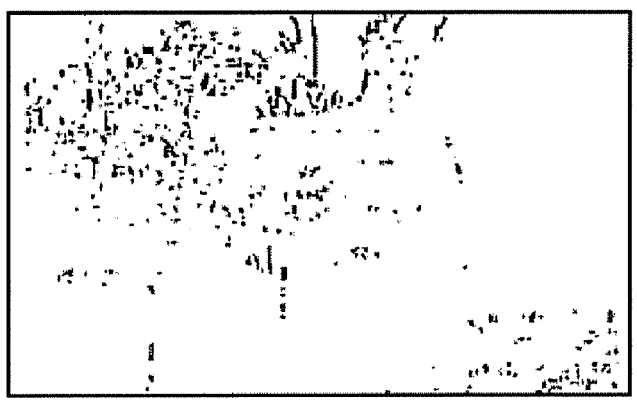
Figure 6A:
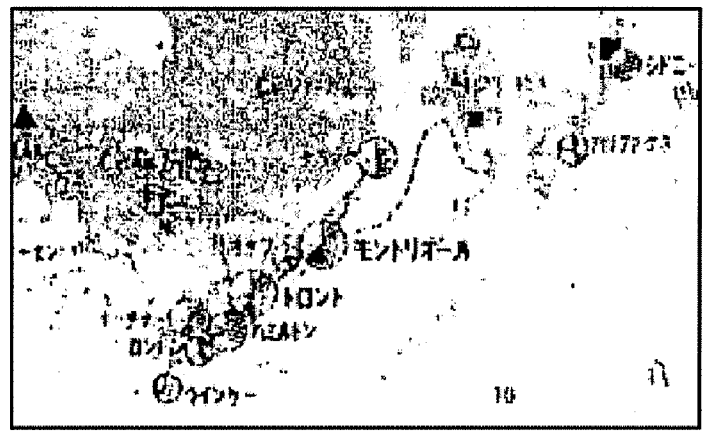
FIGS. 6A to 6C are diagrams illustrating an example of a map image.
Figure 6B:
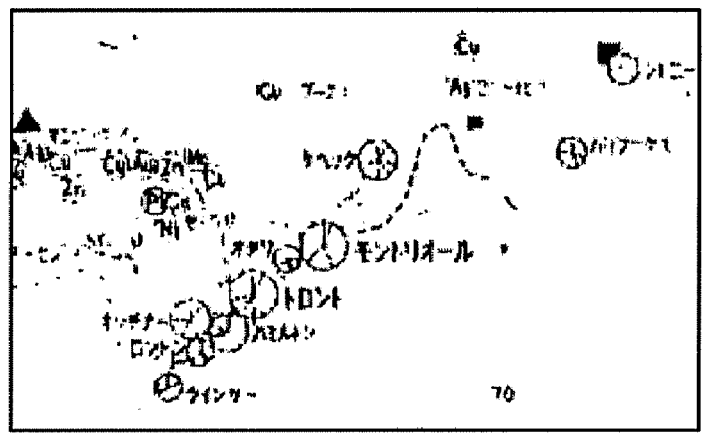
Figure 6C:
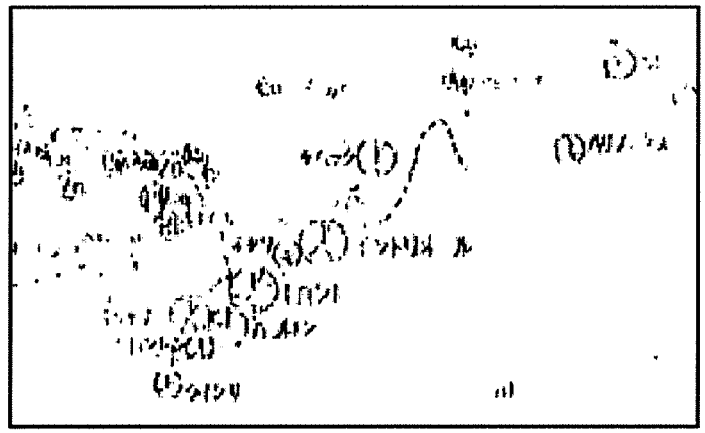
Figure 7:
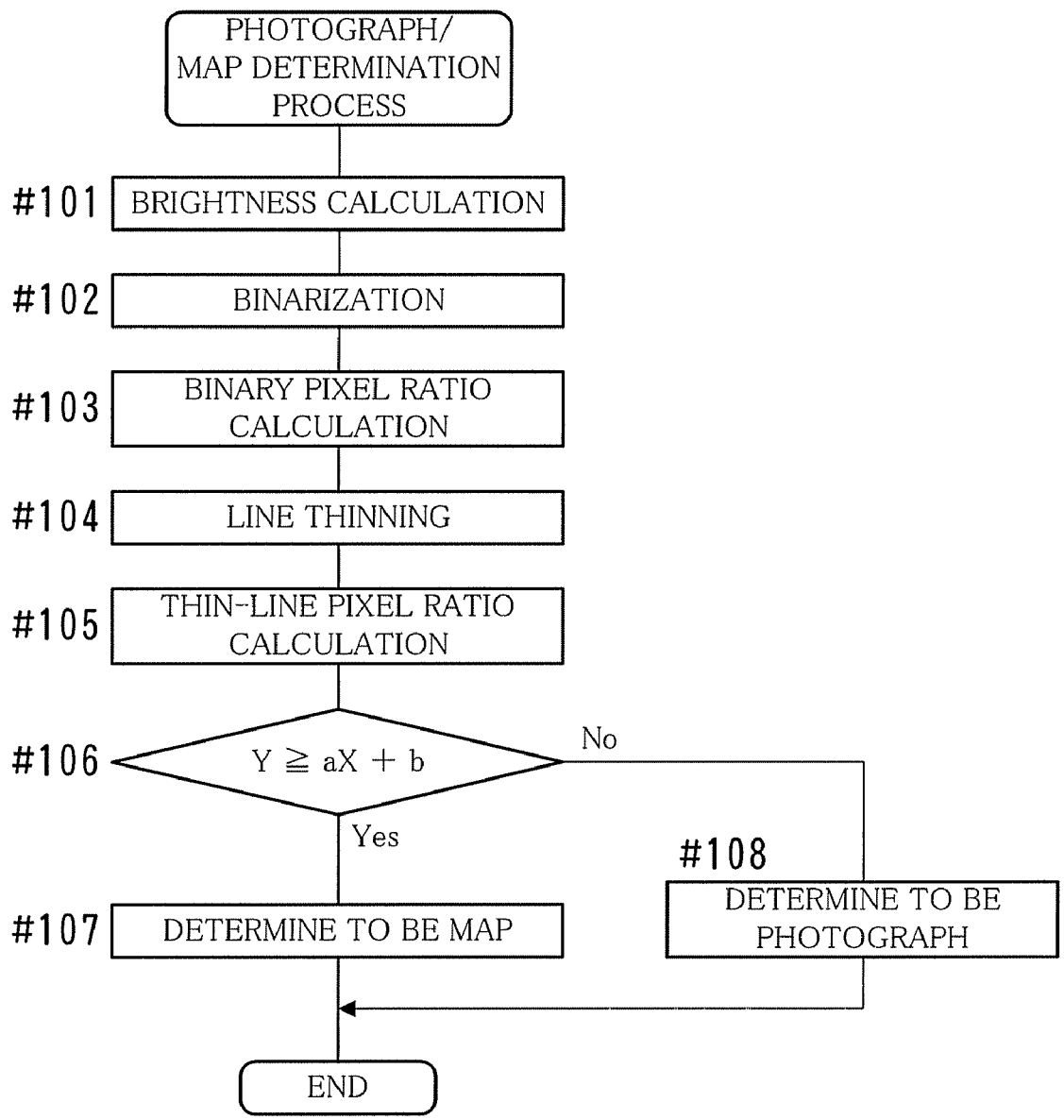
FIG. 7 is a flowchart illustrating the flow of a photograph/map determination process.
Figure 8:
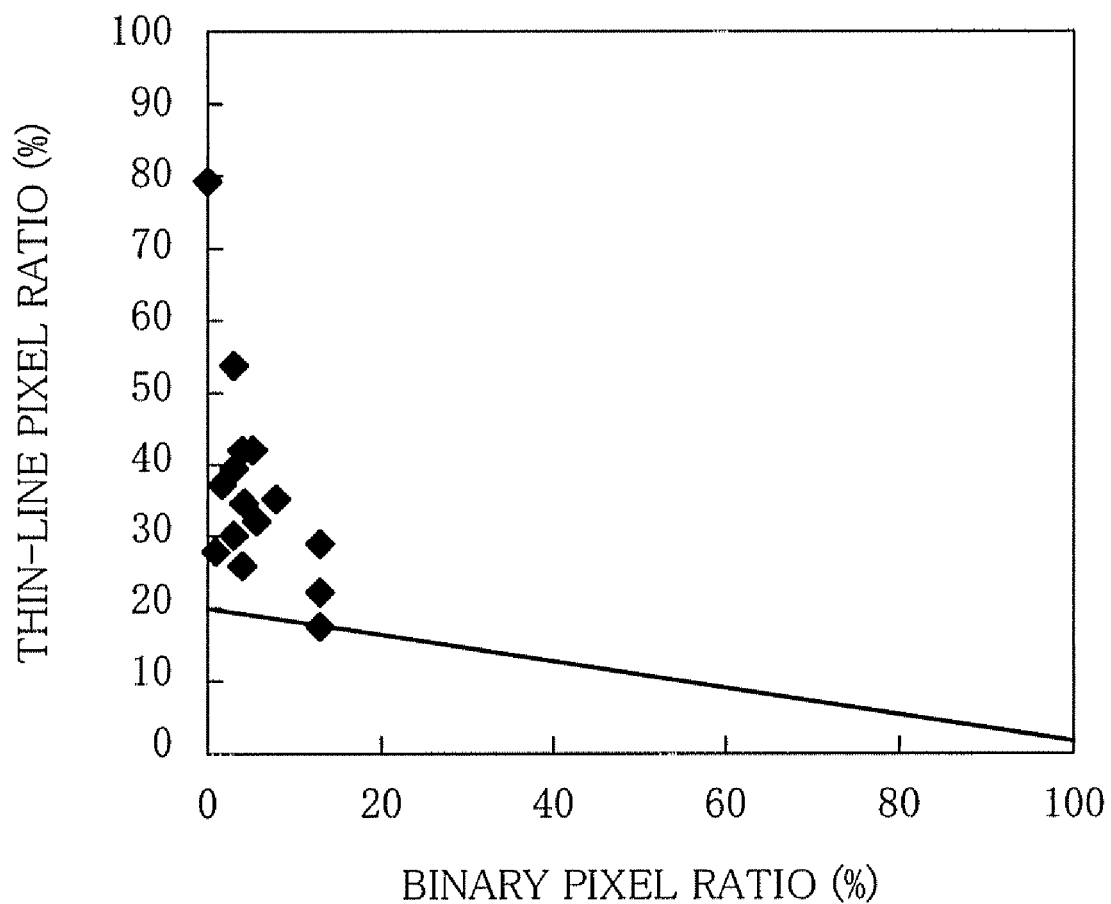
FIG. 8 is a graph illustrating the relationship between binary pixel ratios and thin-line pixel ratios found in multiple map samples.
Figure 9:
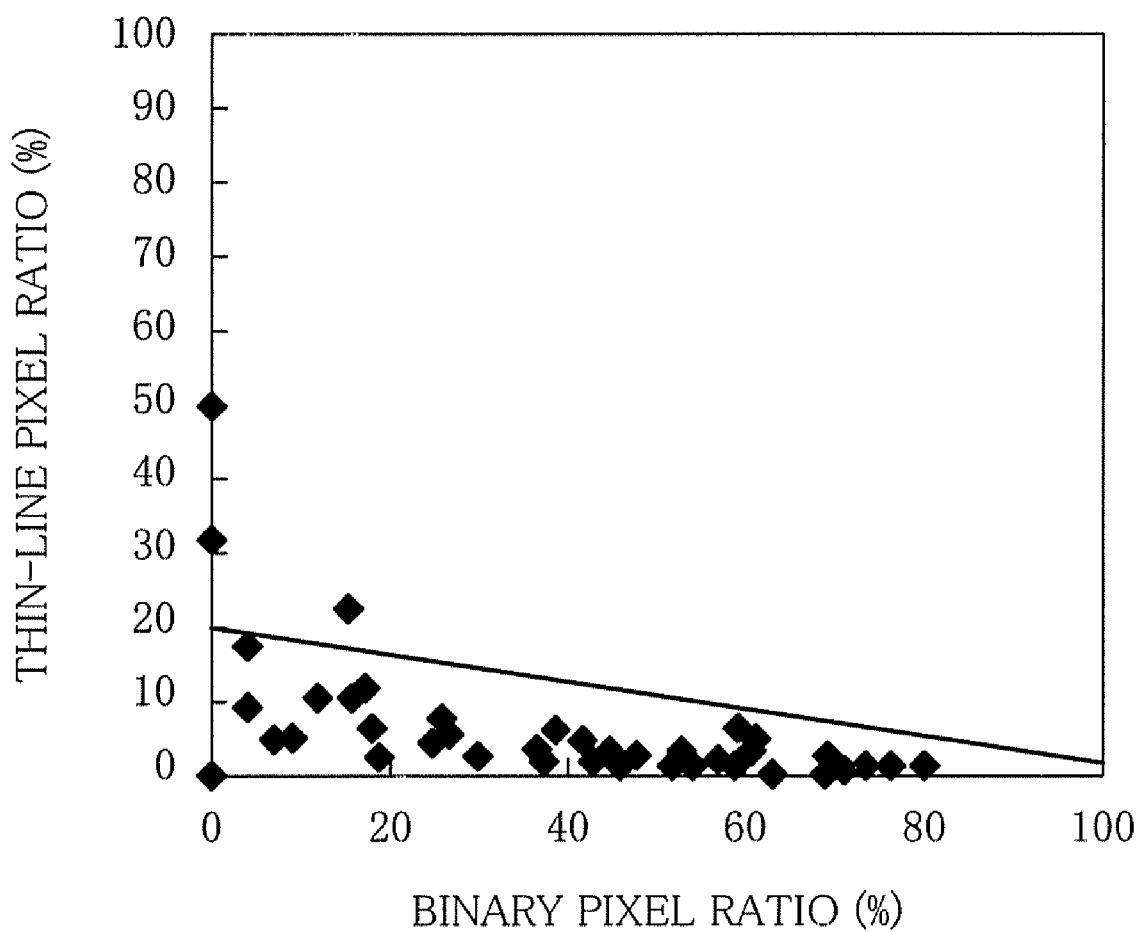
FIG. 9 is a graph illustrating the relationship between binary pixel ratios and thin-line pixel ratios found in multiple photograph samples.

FIG. 4 is a diagram illustrating an example of the configuration of the photograph/map area processing unit 15; FIGS. 5A to 5C are diagrams illustrating an example of a photographic image; FIGS. 6A to 6C are diagrams illustrating an example of a map image; FIG. 7 is a flowchart illustrating the flow of a photograph/map determination process; FIG. 8 is a graph illustrating the relationship between binary pixel ratios and thin-line pixel ratios found in multiple map samples; and FIG. 9 is a graph illustrating the relationship between binary pixel ratios and thin-line pixel ratios found in multiple photograph samples.

Next, processing performed by the photograph/map area processing unit 15 shown in FIG. 4 shall be described with reference to FIGS. 5A to 9. These descriptions assume that the processing is performed on a document image that includes a photograph as shown in FIG. 5A and a map as shown in FIG. 6A.

A brightness image generation unit 101 first performs brightness conversion on the document image data GD expressed as RGB data, thereby generating brightness document image data MG corresponding to the document image, or in other words, data that expresses the document image represented by the document image data GD using the brightness (#101 in FIG. 7).

A binarizing unit 102 then binarizes the generated brightness document image data MG, thereby generating binary document image data NG that expresses a binary image corresponding to the document image (a binary document image) (#102). Through this, the document image in FIGS. 5A and 6A are converted into binary images such as those shown in FIGS. 5B and 6B, respectively.

A binary pixel ratio calculation unit 103 calculates a binary pixel ratio for each non-character/graphic block BKh (#103). The binary pixel ratio is the ratio of black pixels included in portions of the binary document image corresponding to a non-character/graphic block BKh to the total quantity of pixels included in that non-character/graphic block BKh.

A line-thinning unit 104 then performs a line-thinning process on the binary document image data NG, thereby generating thin-line document image data SG expressing a thin-line document image corresponding to the document image (#104). Hereinafter, dotted pixels in the thin-line document image data SG, or in other words, pixels that form thin lines, shall be referred to as "thin-line pixels". Through this, the binary document images shown in FIGS. 5B and 6B are converted into images expressed by thin lines as shown in FIGS. 6C and 6C, respectively.

A thin-line pixel ratio calculation unit 105 calculates a thin-line pixel ratio for each non-character/graphic block BKh (#105). The thin-line pixel ratio is the ratio of the thin-line pixels included in portions of the thin-line document image corresponding to a non-character/graphic block BKh to the total quantity of black pixels included in portions of the binary document image corresponding to that non-character/graphic block BKh.

Meanwhile, as can be seen in FIGS. 5A and 6A, maps tend to have a lighter base color and contain more characters than photographs. Therefore, binarizing an image of a map results in the base portions of the map becoming white pixels, as shown in FIG. 6B, and thus the quantity of black pixels (binarized pixels) therein is less than that in a photograph. Furthermore, performing line-thinning on the binarized image results in the character portions, many of which are included in the image, to remain as thin-line pixels, as shown in FIG. 6C, and thus the ratio of thin-line pixels to black pixels becomes high.

Expressing the relationship between binary pixel ratios and thin-line pixel ratios as a graph as shown in FIGS. 8 and 9 using multiple samples of map images and photographic images makes the difference between the map properties and photographic properties as described thus far even more apparent.

FIG. 8 illustrates a point distribution expressing the relationship between binary pixel ratios and thin-line pixel ratios for multiple map samples. On the other hand, FIG. 9 illustrates a point distribution expressing the relationship between binary pixel ratios and thin-line pixel ratios for multiple photographic samples.

As can be seen in FIGS. 8 and 9, most photographs have a binary pixel ratio of 30% or more, whereas most maps have a binary pixel ratio of 10% or less. Therefore, it is possible to determine whether an object is a photograph or a map to a certain extent based on binary pixel ratios. However, with such a method, it is difficult to perform an accurate determination for images whose binary pixel ratios are around 20%. Accordingly, the present embodiment carries out this determination taking thin-line pixel ratios into consideration as well.

In the examples shown in FIGS. 8 and 9, most photographs have thin-line pixel ratio of 20% or less, whereas most maps have thin-line pixel ratios of 20% or more. Therefore, while it is of course possible to determine whether an object is a photograph or a map simply by using the thin-line pixel ratio of 20% as a border, the present embodiment performs determination using a straight line expressed as $Y=-aX+b$, found using a parameter "a" for slope and a parameter "b" for an intercept, as a border line, in order to increase the determination accuracy. In the examples of FIGS. 8 and 9, the determination accuracy is favorable when the value of a is approximately $-\frac{1}{5}$ and the value of b is approximately 20. Note that the value of a may be taken as 0, with a straight line represented by $Y=b$ used as the border line.

A photograph/map determination unit 106 determines whether a non-character/graphic block BKh is a photographic block BK or a map block BK based on the thin-line pixel ratio and the binary pixel ratio of that non-character/graphic block BKh (#106). In the present embodiment, in the case where the binary pixel ratio (X) and the thin-line pixel ratio (Y) fulfill the conditions of formula (1) (Yes in #106), the block BK is determined to be a map block BK (#107).

$$Y \geq -aX+b \quad (1)$$

(where a and b are positive integers)

However, in the case where the binary pixel ratio (X) and the thin-line pixel ratio (Y) fulfill the conditions of formula (2) (No in #106), the block BK is determined to be a photographic block BK (#108).

$$Y < -aX+b \quad (2)$$

(where a and b are positive integers)

A character extraction unit 107 then extracts the characters included in each block BK determined to be photographic blocks BK, and finds blocks BK that contain those characters. This extraction is performed using a known method. With the example shown in FIG. 3, this process finds blocks BK containing the characters included in the photographic block BK41.

Figure 10:
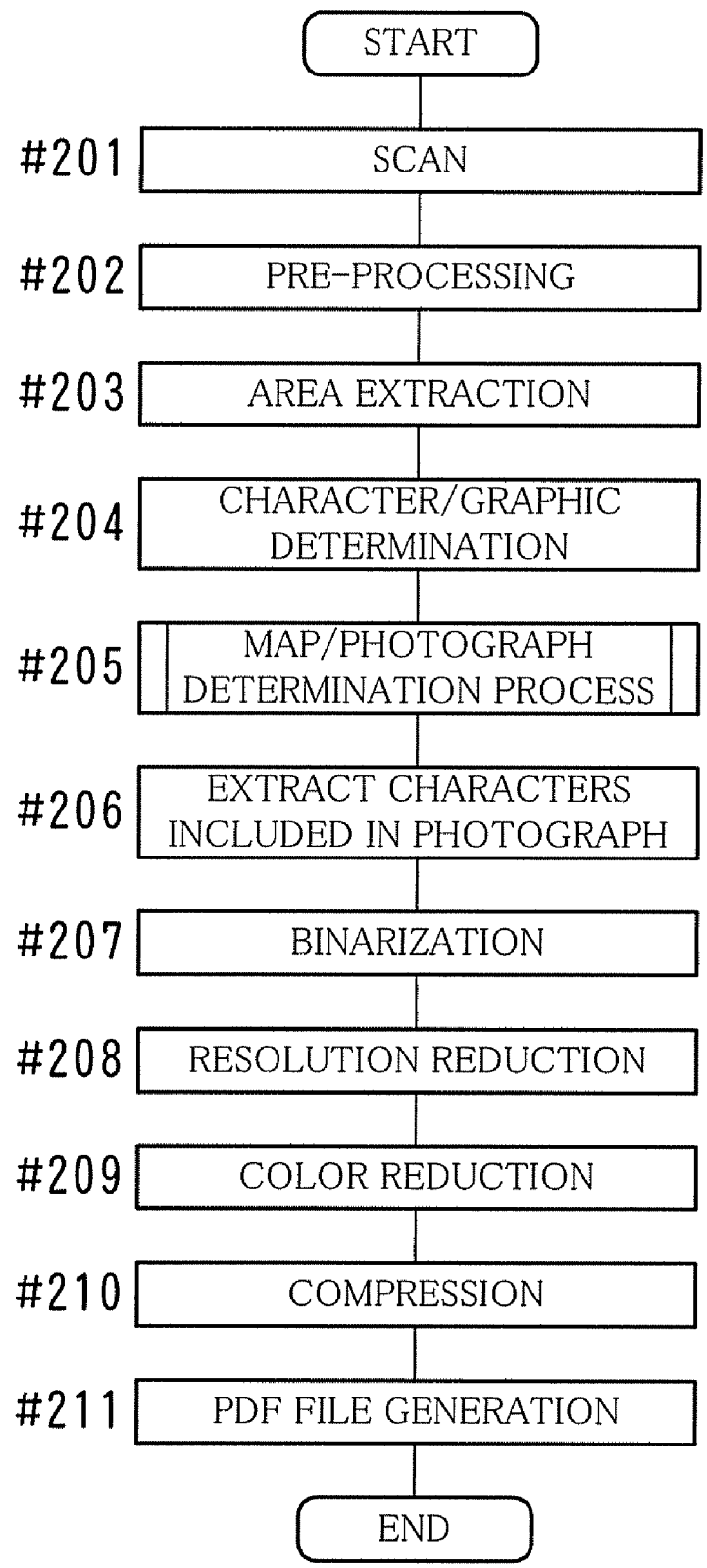
FIG. 10 is a flowchart illustrating the flow of the overall process performed by an image forming apparatus when generating a PDF file.

FIG. 10 is a flowchart illustrating the flow of the overall process performed by the image forming apparatus 1 when generating a PDF file.

When the user sets a document in the scanner 10a, sets the storage format to PDF, and inputs a command to execute the scan, the image forming apparatus 1 scans the image of the document (#201 in FIG. 10), and performs a process for converting the document image data GD obtained through the scan into a PDF file.

At that time, the image forming apparatus 1 performs pre-processing on the document image data GD (#202), and then uses the pre-processed document image data GD to find the blocks BK that contain the various objects included therein (#203). The image forming apparatus 1 furthermore determines the types of the blocks BK that have been found. During this determination, it is first determined whether the blocks BK are character blocks, graphic blocks, or other types of blocks (#204).

The image forming apparatus 1 then performs the photograph/map determination process on the non-character/graphic blocks BKh, which are the blocks Bk that have been determined to be neither characters nor graphics (see FIG. 7), and then determines whether each of the non-character/graphic blocks BKh is a photographic block BK or a map block BK (#205).

Next, characters included in the block BK that has been determined to be a photographic block BK are extracted, and blocks BK that contain those characters are found (#206).

Portions of the document image corresponding to the blocks BK determined to be character blocks BK in step #204 and the character blocks BK found in step #206 are then binarized, and the characters and background are separated (#207). Portions of the document image corresponding to the separated background and the blocks BK determined to be photographic blocks BK in step #205 then undergo resolution reduction (#208). Note that only the portions of the photographic blocks BK that do not contain characters undergo the resolution reduction.

Next, portions of the document image corresponding to blocks BK determined to be graphic blocks BK in step #204 undergo color reduction processing (#209).

Compression processes suited to the type of the blocks BK are then performed on the data of each of those blocks BK (#210). To be more specific, the character data included in character blocks BK is compressed using a lossless compression technique such as MMR. The color-reduced data of graphic blocks BK is compressed using a lossless compression technique such as FLATE. The data of photographic blocks BK and background portions of character blocks BK, which has undergone resolution reduction, is compressed using a compression technique such as JPEG. Finally, map blocks BK do not undergo resolution reduction as in the case of the photographic blocks BK, and are compressed using a compression technique such as JPEG, with the compression rate lowered more than in the case of the photographic blocks BK so as to suppress image quality degradation.

A PDF file is then generated using the compressed data of the blocks BK and stored (#211).

According to the present embodiment, determination as to whether an object is a map or a photograph is performed based on the relationship between binary pixel ratios and thin-line pixel ratios, as well as the aforementioned formulas (1) and (2). This makes it possible to determine whether an object is a map or a photograph with high accuracy. The determination can furthermore be performed using a simple process. In short, it is possible to accurately determine map areas using a simpler process than the conventional techniques.

Furthermore, because maps do not undergo resolution reduction and are compressed at a low compression rate, characters included in the maps can be kept highly legible.

Although character and map blocks BK do not undergo resolution reduction processing in the present embodiment, such processing may be carried out. In such a case, the resolution reduction is performed in such a manner that, for example, the resolution of those blocks BK is at least higher than that of photographic blocks BK, so that the legibility of the characters contained in those blocks BK is maintained.

Part of the functions of the various elements in FIG. 2 may be implemented as hardware. For example, the image forming apparatus 1 may be provided with hardware such as an input image processing unit, an output image processing unit, and so on. The input image processing unit accepts the document image data GD from the scanner 10a, and performs processes such as color conversion, color correction, resolution conversion, area determination, and so on. The output image processing unit performs processes such as screen control, smoothing processing, PWM control, and so on.

Finally, the configuration and functions of all or part of the image forming apparatus 1, the details or order of the processing performed thereby, the details of the various pieces of data, and so on can be modified in various ways within the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A method for compressing an image, the method comprising:
    generating a binary image by binarizing the image;
    calculating a binary pixel ratio that is a ratio of a binary pixel quantity that is a quantity of dotted pixels included in a specific area of the binary image to a total quantity of pixels included in the specific area of the binary image;
    generating a thin-line image by performing a line-thinning process on the specific area;
    calculating a thin-line pixel ratio that is a ratio of the quantity of dotted pixels included in the thin-line image to the binary pixel quantity;
    determining that the specific area is a map area or a photograph area based on the calculated binary pixel ratio and the calculated thin-line pixel ratio;
    compressing, when the specific area is determined to be a photograph area, an image of the specific area after reducing resolution of the image of the specific area; and
    compressing, when the specific area is determined to be a map area, the image of the specific area without reducing the resolution of the image of the specific area.

2. The method according to claim 1, wherein the image of the specific area is compressed at a lower compression ratio when the specific area is determined to be a map area than when the specific area is determined to be a photograph area.

3. The method according to claim 1, wherein the thin-line image is generated by performing the line-thinning process on the specific area after binarizing the specific area.

4. The method according to claim 1, wherein the specific area is determined to be the map area when the calculated thin-line pixel ratio is greater than or equal to a sum of a first predetermined value and a second predetermined value multiplied by the calculated binary pixel ratio.

5. A method for compressing an image, the method comprising:
    generating a binary image by binarizing the image;
    calculating a binary pixel ratio that is a ratio of a binary pixel quantity that is a quantity of dotted pixels included in a specific area of the binary image to a total quantity of pixels included in the specific area of the binary image;
    generating a thin-line image by performing a line-thinning process on the specific area;
    calculating a thin-line pixel ratio that is a ratio of the quantity of dotted pixels included in the thin-line image to the binary pixel quantity;
    determining that the specific area is a map area or a photograph area based on the calculated binary pixel ratio and the calculated thin-line pixel ratio;
    compressing, when the specific area is determined to be a photograph area, an image of the specific area after reducing resolution of the image of the specific area; and
    compressing, when the specific area is determined to be a map area, the image of the specific area after reducing the resolution of the image of the specific area to be higher than that when the specific area is determined to be a photograph area.

6. The method according to claim 5, wherein the image of the specific area is compressed at a lower compression ratio when the specific area is determined to be a map area than when the specific area is determined to be a photograph area.

7. The method according to claim 5, wherein the thin-line image is generated by performing the line-thinning process on the specific area after binarizing the specific area.

8. The method according to claim 5, wherein the specific area is determined to be the map area when the calculated thin-line pixel ratio is greater than or equal to a sum of a first predetermined value and a second predetermined value multiplied by the calculated binary pixel ratio.

9. An image compression apparatus for compressing an image, the apparatus comprising:
    a binary image generation portion generating a binary image by binarizing the image;

a binary pixel ratio calculation portion calculating a binary pixel ratio that is a ratio of a binary pixel quantity that is a quantity of dotted pixels included in a specific area of the binary image to a total quantity of pixels included in the specific area of the binary image;

a thin-line image generation portion generating a thin-line image by performing a line-thinning process on the specific area;

a thin-line pixel ratio calculation portion calculating a thin-line pixel ratio that is a ratio of the quantity of dotted pixels included in the thin-line image to the binary pixel quantity;

an area determination portion determining that the specific area is a map area or a photograph area based on the calculated binary pixel ratio and the calculated thin-line pixel ratio; and a compression processing portion compressing an image of the specific area after reducing resolution of the image of the specific area when the area determination portion determines that the specific area is a photograph area, and compressing the image of the specific area without reducing the resolution of the image of the specific area when the area determination portion determines that the specific area is a map area.

10. The image compression apparatus according to claim 9, wherein the compression processing portion compresses the image of the specific area at a lower compression ratio when the area determination portion determines that the specific area is a map area than when it determines that the specific area is a photograph area.

11. The image compression apparatus according to claim 9, wherein the thin-line image generation portion generates the thin-line image by performing the line-thinning process on the specific area after the binary image generation portion binarizes the specific portion.

12. The image compression apparatus according to claim 9, wherein the area determination portion determines that the specific area is the map area when the calculated thin-line pixel ratio is greater than or equal to a sum of a first predetermined value and a second predetermined value multiplied by the calculated binary pixel ratio.

13. An image compression apparatus for compressing an image, the apparatus comprising:

a binary image generation portion generating a binary image by binarizing the image;

a binary pixel ratio calculation portion calculating a binary pixel ratio that is a ratio of a binary pixel quantity that is a quantity of dotted pixels included in a specific area of the binary image to a total quantity of pixels included in the specific area of the binary image;

a thin-line image generation portion generating a thin-line image by performing a line-thinning process on the specific area;

a thin-line pixel ratio calculation portion calculating a thin-line pixel ratio that is a ratio of the quantity of dotted pixels included in the thin-line image to the binary pixel quantity;

an area determination portion determining that the specific area is a map area or a photograph area based on the calculated binary pixel ratio and the calculated thin-line pixel ratio; and a compression processing portion compressing, when the area determination portion determines that the specific area is a photograph area, an image of the specific area after reducing resolution of the image of the specific area, and compressing, when the area determination portion determines that the specific area is a map area, the image of the specific area after reducing the resolution of the image of the specific area to be higher than that when the area determination portion determines that the specific area is a photograph area.

14. The image compression apparatus according to claim 13, wherein the compression processing portion compresses the image of the specific area at a lower compression ratio when the area determination portion determines that the specific area is a map area than when the area determination portion determines that the specific area is a photograph area.

15. The image compression apparatus according to claim 13, wherein the thin-line image generation portion generates the thin-line image by performing the line-thinning process on the specific area after the binary image generation portion binarizes the specific portion.

16. The image compression apparatus according to claim 13, wherein the area determination portion determines that the specific area is the map area when the calculated thin-line pixel ratio is greater than or equal to a sume of a first predetermined value and a second predetermined value multiplied by the calculated binary pixel ratio.

* * * * *